(12) United States Patent
Chen et al.

(10) Patent No.: US 12,205,301 B2
(45) Date of Patent: Jan. 21, 2025

(54) SHIP IMAGE TRAJECTORY TRACKING AND PREDICTION METHOD BASED ON SHIP HEADING RECOGNITION

(71) Applicants: Shanghai Maritime University, Shanghai (CN); Wuhan University of Technology, Wuhan (CN)

(72) Inventors: Xinqiang Chen, Shanghai (CN); Hao Wu, Shanghai (CN); Yongsheng Yang, Shanghai (CN); Bing Wu, Shanghai (CN); Yang Sun, Shanghai (CN); Huafeng Wu, Shanghai (CN); Wei Liu, Shanghai (CN); Jiangfeng Xian, Shanghai (CN)

(73) Assignees: Shanghai Maritime University, Shanghai (CN); Wuhan University of Technology, Wuhan (CN)

( * ) Notice: Subject to any disclaimer, the term of this patent is extended or adjusted under 35 U.S.C. 154(b) by 377 days.

(21) Appl. No.: 17/886,901

(22) Filed: Aug. 12, 2022

(65) Prior Publication Data

US 2024/0013402 A1 Jan. 11, 2024

(30) Foreign Application Priority Data

Jul. 6, 2022 (CN) .......................... 202210789127.0

(51) Int. Cl.
*G06T 7/20* (2017.01)
*G01C 21/20* (2006.01)

(52) U.S. Cl.
CPC .............. *G06T 7/20* (2013.01); *G01C 21/203* (2013.01); *G06T 2207/10016* (2013.01); *G06T 2207/20081* (2013.01); *G06T 2207/30241* (2013.01)

(58) Field of Classification Search
CPC .. G06T 7/20; G06T 7/77; G06T 7/277; G06T 2207/10016; G06T 2207/20081;
(Continued)

(56) References Cited

U.S. PATENT DOCUMENTS

2020/0264268 A1* 8/2020 Moore ................... G06V 20/52

FOREIGN PATENT DOCUMENTS

CN 111292360 A * 6/2020 ........... G01C 21/203
CN 112308881 A * 2/2021 ............. G06T 7/246
(Continued)

*Primary Examiner* — Carol Wang
(74) *Attorney, Agent, or Firm* — Westbridge IP LLC

(57) ABSTRACT

Disclosed is a ship image track tracking and prediction method based on ship heading recognition, which includes the following steps: obtaining a ship image data set, preprocessing the data set to obtain a preprocessed data set; inputting the preprocessed data set into the rotating ship detection network for training, obtaining the trained rotating ship detection network, collecting the ship navigation video, and inputting the ship navigation video into the trained rotating ship detection network to obtain the ship detection result; inputting the ship detection result into the rotating ship tracking network and tracking the target ship to obtain the historical trajectory and the heading information of the target ship; inputting the historical trajectory and ship heading information of the target ship into the ship trajectory and ship heading prediction network, and predicting the navigation trajectory and ship heading at sea.

5 Claims, 2 Drawing Sheets

(58) Field of Classification Search
CPC . G06T 2207/30241; G06T 2207/20016; G06T 2207/2008; G01C 21/203; G08G 3/00; G06V 10/25; G06V 10/454; G06V 10/62; G06V 10/82
See application file for complete search history.

(56) References Cited

FOREIGN PATENT DOCUMENTS

| | | | | | |
|---|---|---|---|---|---|
| CN | 113299117 A | * | 8/2021 | ........... | E02B 17/003 |
| WO | WO-2020115893 A1 | * | 6/2020 | | |

* cited by examiner

SHIP IMAGE TRAJECTORY TRACKING AND PREDICTION METHOD BASED ON SHIP HEADING RECOGNITION

CROSS-REFERENCE TO RELATED APPLICATIONS

This application claims priority to Chinese Patent Application No. 202210789127.0, filed on Jul. 6, 2022, the contents of which are hereby incorporated by reference.

TECHNICAL FIELD

The application relates to the technical field of target detection, tracking and trajectory prediction, and in particular to a ship image trajectory tracking and prediction method based on ship heading recognition.

BACKGROUND

In recent years, unmanned and intelligent ships at sea have been developed. Big data, deep learning, distributed computing and other emerging technologies are combined in the development, and ships are of environmental protection, safety and high efficiency. Intelligent ship perception system is an essential part. Accurate ship detection and tracking can not only provide help for maritime reconnaissance and rescue, but also provide important information for port monitoring, terminal management and safe sailing. Nowadays, the detection and tracking algorithms based on conventional algorithms are far less accurate and effective than those based on deep learning. Furthermore, the algorithm based on deep learning to assist ship detection greatly promotes the development of ship detection, which no longer needs manual feature selection and greatly improves the detection accuracy and efficiency. The effect of tracking algorithm mainly depends on the detection algorithm, so it is very important to design an accurate ship detection algorithm.

At present, the detection methods based on deep learning are mainly divided into two categories: one is the region-based two-stage target detection algorithm represented by Region-CNN, which has high detection accuracy, but the detection speed cannot meet the real-time requirements; the other is the one-stage detection algorithm represented by YOLO (You Only Look Once) and SSD (Single Shot MultiBox Detector), which convert the detection problem into regression problem and directly completes the end-to-end detection, which greatly improves the detection speed. However, whether it is the first-stage method or the second-stage method, the conventional maritime detection method is generally based on the horizontal rectangular frame, but the horizontal rectangular frame has the following disadvantages.

Firstly, marking ships with horizontal rectangular frames will contain too much background information, for example, after network training, some waves in the background may be mistaken for ships when detecting ships at sea.

Secondly, when two or more ships overlap in the video, the algorithm may mistakenly delete the larger overlapping targets in the final non-maximum suppression stage.

Thirdly, horizontal rectangular frames will lead to strong overlapping between inspection frames, which may cause false inspection when multiple ships overlap.

Lastly, the horizontal rectangular frame may not contain the moving direction of the object, so it may not well judge the moving track of the ship.

Therefore, how to design an accurate and fast detection method of rotating frame is very valuable in intelligent ships and other related fields. However, after designing a better rotating target detection algorithm, the tracking and trajectory prediction of ships can obtain more accurate results. Compared with the traditional method, using the ship heading information detected by the rotating frame to ship tracking can solve the problem of re-recognition caused by ship occlusion in the tracking process, thus improving the tracking accuracy.

In traditional road traffic, the orientation of cars is generally fixed and will change with the lane. However, in the actual marine ship detection, the ship heading changes greatly because of the influence of wind and waves, and the traditional ship detection and tracking will not use the heading information, which will lead to the problem of ship identity re-recognition due to ship occlusion in the tracking process. As mentioned above, after obtaining the ship heading information, the ship heading information can be made full use of in the tracking process to avoid re-recognition, so as to better predict the ship trajectory and heading at sea, which has practical value in dock scheduling, collision detection of ships at sea and autonomous navigation of intelligent ships.

SUMMARY

In view of the problems existing in the prior art, the present application provides a ship image trajectory tracking and prediction method based on ship heading recognition, which improves the detection accuracy of various ships under complex ocean background, and can more accurately mark the ships to be detected, prevent the re-recognition problem caused by ship occlusion during ship tracking, and obtain more accurate navigation trajectory and ship heading prediction information.

To achieve the above objectives, the present application provides the following solutions.

A ship image trajectory tracking and prediction method based on ship heading recognition includes:

S1: obtaining a ship image data set, and preprocessing the data set to obtain a preprocessed data set;

S2: inputting the preprocessed data set into a rotating ship detection network for training to obtain a trained rotating ship detection network, collecting a ship navigation video, and inputting the ship navigation video into the trained rotating ship detection network to obtain a ship detection result;

S3: inputting the ship detection result into the rotating ship tracking network, and tracking a target ship, so as to obtain historical trajectory and ship heading information of the target ship; and S4: inputting the historical trajectory and the ship heading information of the target ship into a ship trajectory and ship heading prediction network, and predicting the navigation trajectory and ship heading of sea ships.

Preferably, preprocessing the data set includes: labeling label data containing the ship heading information by using an 8-parameter rotating frame labeling method, and preprocessing labeled images and labels, and processing the ship heading information by a way of circular smooth label and outputting the ship heading data; the ship label data includes an abscissa of a center of a marking frame, an ordinate of the center of the marking frame, a width of the marking frame, a height of the marking frame and processed ship heading information.

Preferably, the process of inputting the preprocessed data set into a rotating ship detection network for training includes: inputting the preprocessed data set into a backbone network added with a coordinate attention module for ship feature extraction, performing a feature fusion through a feature pyramid, and outputting a first ship feature map; inputting the first ship feature map into a pixel aggregation network for a further ship feature processing, outputting a second feature map; fusing the second feature map based on an adaptive fusion method to obtain a third ship feature map; performing a border and rotation angle regression operation on the third ship feature map, and calculating ship category loss, border loss, rotation angle loss and score confidence loss; minimizing a loss function by using the gradient descent algorithm and updating network parameters to complete the training of the rotating ship detection network.

Preferably, the coordinate attention module aggregates ship feature images input in vertical and horizontal directions into two independent directional perception feature maps through two one-dimensional global pooling operations.

Preferably, fusing the second feature map based on the adaptive fusion method, including: up/down sampling the second feature maps with different sizes to obtain a new feature map with the same size, and multiplying and adding the new feature map with the same size with weight parameters from different layers to obtain the third ship feature map.

Preferably, the loss function includes target classification loss, θ classification loss, border regression loss and confidence loss, and the expression of the loss function $\mathcal{L}_{total}$ is as follows:

$$\mathcal{L}_{total} = \mathcal{L}_{cls} + \mathcal{L}_{\theta} + \mathcal{L}_{IOU} + \mathcal{L}_{obj}$$

where $\mathcal{L}_{IOU}$ is target border regression loss, and $\mathcal{L}_{cls}$, $\mathcal{L}_{\theta}$ and $\mathcal{L}_{obj}$ are the target classification loss, the θ classification loss and confidence regression loss, respectively.

Preferably, tracking the target ship includes: carrying out ship detection on image frames in the input ship navigation video through the rotating ship detection network to obtain ship rotating frames, and marking a code for each ship in the rotating frames; in next frame, rotating frames of all ships are obtained by the same method, and all the rotating frame information is decoupled into horizontal frame information and the ship heading information; using Kalman filter to predict a prediction frame of the next frame according to the position of an image frame detection frame, calculating a horizontal frame intersection ratio of the prediction frame of the next frame and all image frame detection frames, and establishing a cost matrix based on the intersection ratio; obtaining n detection frames with the largest intersection ratio with the prediction frames by Hungarian algorithm, and calculating the confidence $C_i$ of the n detection frames; filtering re-recognition problems in a tracking process by the rotating ship tracking network, and selecting the rotating frame with a highest confidence as a target tracking frame to complete a tracking of the target ship.

Preferably, predicting the navigation trajectory and ship heading of sea ships includes: obtaining tracking data of the target ship, screening trajectories with tracking frames smaller than a preset threshold, trajectories with trajectory points concentrated in a same area and abnormal trajectories with distances between a plurality of predicted trajectory points larger than the preset threshold; in screened normal trajectories, deleting the abnormal trajectory points with the distance between adjacent trajectory points or the ship heading exceeding the preset threshold, and obtaining a trajectory sequence including the ship heading is obtained by a mean value method; inputting the trajectory sequence into the prediction network to obtain prediction results.

Preferably, the process of inputting the historical trajectory and the ship heading information of the target ship into a ship trajectory and ship heading prediction network, and predicting the navigation trajectory and ship heading of sea ships includes: inputting the trajectory sequence including the ship heading into the prediction network, determining a prediction time, extracting coordinates of a point from the trajectory sequence every same time frame, and obtaining a determined length point as an input sequence as the input of the trajectory and ship heading prediction network, so as to obtain the prediction information of future driving trajectories and ship heading of the target ships.

The application has the following beneficial effects.

Firstly, the application proposes a ship image trajectory tracking and prediction method based on ship heading recognition, wherein the detection of ship heading is added to the conventional ship detection, and the common boundary problem in rotation detection is improved by using the circular smooth label method; the spatial coordinate attention mechanism and the self-adaptive feature fusion method are added to the detection network to increase the detection accuracy, and the detected ship heading information is used in the tracking network to improve the re-recognition problem caused by the overlapping of ships in the video, and finally the tracked ship trajectory and heading information is used to predict the ship future trajectory.

Lastly, the method of the application has good ship tracking and trajectory prediction effect, and the finally obtained trajectory and prediction data can be used for recognition of abnormal behaviours of ships, danger judgment, etc., which can effectively improve the safety of autonomous navigation of intelligent ships.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative labor.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labour are within the scope of the present application.

In order to make the above objects, features and advantages of the present application more obvious and understandable, the present application will be explained in further detail below with reference to the drawings and detailed description.

Figure 1:
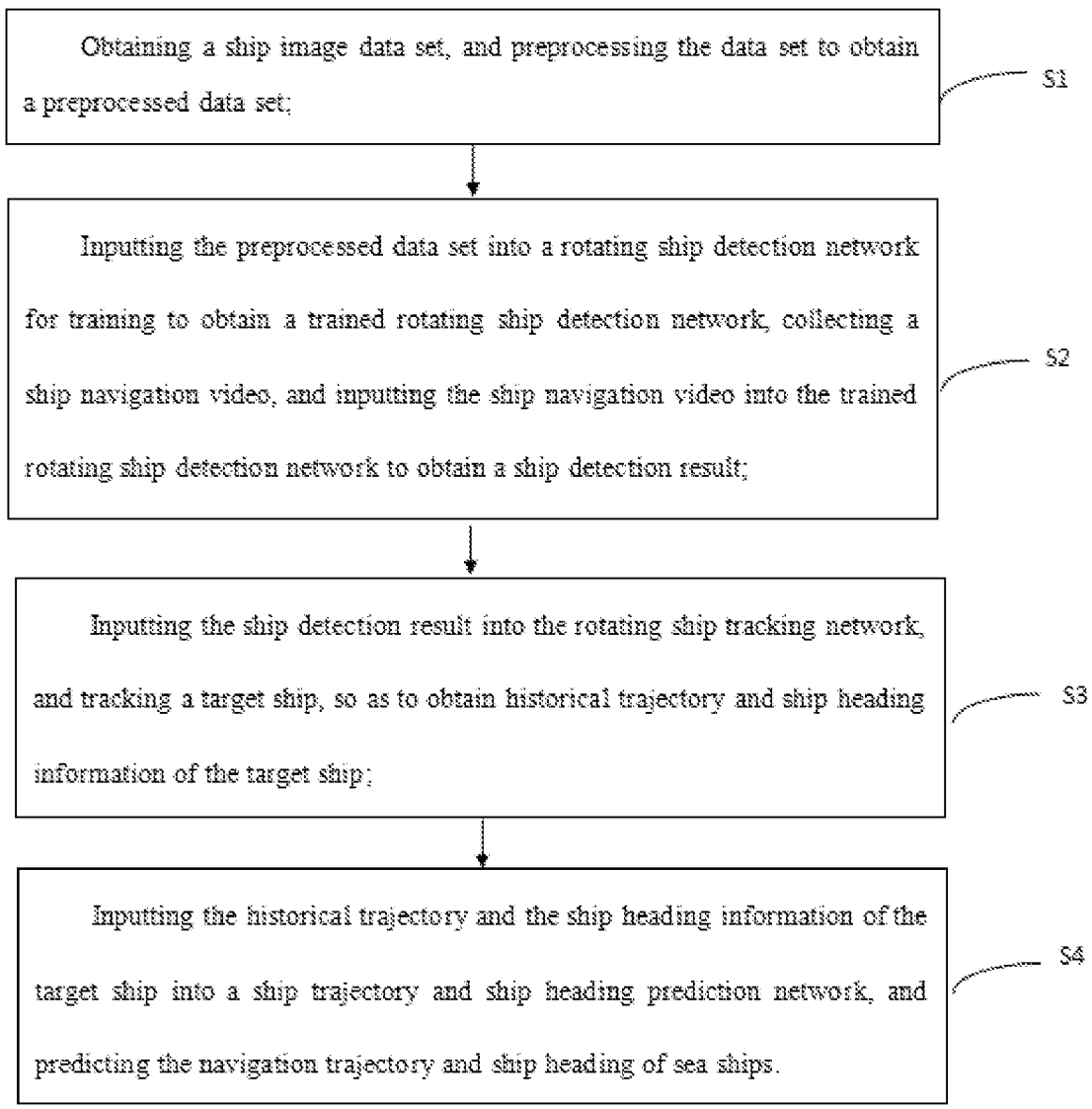
FIG. 1 is a flow chart of a ship image trajectory tracking and prediction method based on ship heading recognition according to an embodiment of the present application.

This embodiment provides a ship image trajectory tracking and prediction method based on ship heading recognition, as shown in FIG. 1, which mainly includes the following steps:

S1, obtaining a ship image data set with ship heading information, and inputting the data set into a rotating ship detection network after preprocessing.

By rotating the general rectangle marking frame, the ship data set is obtained, and its format is (x1, y1, x2, y2, x3, y3, x4, y4), which are the two-dimensional coordinate information of the four vertices of the rotating rectangle. Further, the ship heading information is preprocessed by circular smooth label method, and then the ship label data in (x, y, w, h, θ) format is obtained. Other data preprocessing methods for smooth labels include normalization, rotation and translation, mosaic enhancement and other common data enhancement methods.

The circular label changes the ship heading information from regression to classification, thus solving the problem of excessive boundary loss caused by conventional ship angle regression. The specific expression is formula (1):

$$CSL(m) = \begin{cases} g(m), \theta - r < m < \theta + r \\ 0, \text{other} \end{cases} \quad (1)$$

where g(m) is the window function, here Gaussian function is used as the window function, and its expression is $g(m)=ae^{-(m-b)^2/2c^2}$. Where a, b and c are all constants; the variable m is the set of possible values of the heading, r is the radius of the window function, and θ is the input heading label value.

S2, building a feature extraction network with attention mechanism, and finally building a rotating ship detection network through feature fusion.

Figure 2:
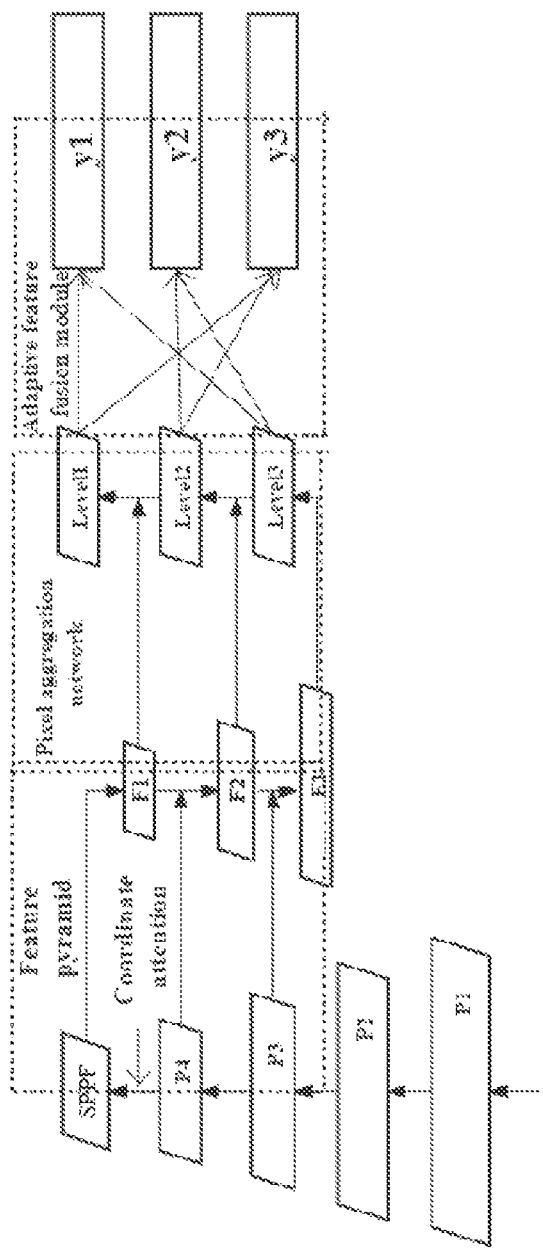
FIG. 2 is a schematic diagram of data set labelling according to an embodiment of the present application.

As shown in FIG. 2, the rotating ship detection network inputs the processed images into the backbone network added with the coordinate attention module to extract the ship features, and carries out feature fusion through the feature pyramid to output three kinds of ship feature maps F1, F2 and F3. The coordinate attention module aggregates the vertical and horizontal input ship features into two independent directional perception feature maps through two one-dimensional global pooling operations. The specific adding location is the layer before the fast space Pyramid pool layer (SPFF).

Furthermore, the feature maps F1, F2 and F3 are input into the pixel aggregation network for further ship feature processing, and three ship feature maps of different sizes, Level1, Level2 and Level3, are output. Further, Level1, Level2, Level3 are fused to output the ship feature layers $y^1$, $y^2$, $y^3$ by self-adaptive feature fusion.

The specific feature fusion process is as follows: before the fusion, the level 1, level 2 and level 3 feature maps with different sizes should be sampled up/down to make the sizes consistent. Level1, level2, level3 are multiplied and added by weight parameters α, β and γ from different layers, and new fusion feature layers $y^1$, $y^2$ and $y^3$ can be obtained, as shown in the following formula (2):

$$y_{ij}^l = \alpha_{ij}^l \cdot \text{Lev}_{ij}^{1 \to l} + \beta_{ij}^l \cdot \text{Lev}_{ij}^{2 \to l} + \gamma_{ij}^l \cdot \text{Lev}_{ij}^{3 \to l} \quad (2)$$

in formula (2), $\text{Lev}_{ij}^{n \to l}$ represents the eigenvector adjusted from the feature of level n to the same size of level L. $\alpha_{ij}^l$, $\beta_{ij}^l$, and $\gamma_{ij}^l$ represent the weights of eigenvectors of feature layer 1 at different feature layers $\text{Lev}_{ij}^{1 \to l}$, $\text{Lev}_{ij}^{2 \to l}$ and $\text{Lev}_{ij}^{3 \to l}$ at each (i, j), respectively. $y_{ij}^l$ represents the eigenvector obtained by multiplying the eigenvector at each (i, j) and its corresponding weight $\alpha_{ij}^l$, $\beta_{ij}^l$, $\gamma_{ij}^l$ and then adding it. Note that the weight must satisfy the constraint condition of $\alpha_{ij}^l + \beta_{ij}^l + \gamma_{ij}^l = 1$ and $\alpha_{ij}^l, \beta_{ij}^l, \gamma_{ij}^l \in [0,1]$, $\lambda_\alpha^l$, $\lambda_\beta^l$, $\lambda_\gamma^l$ are obtained by convolution of $x_{ij}^{1 \to l}$, $x_{ij}^{2 \to l}$, $x_{ij}^{3 \to l}$ with 1*1 and the flexible maximum transfer function (softmax)

$$\alpha_{ij}^l = \frac{e^{\lambda_{\alpha_{ij}}^l}}{e^{\lambda_{\alpha_{ij}}^l} + e^{\lambda_{\beta_{ij}}^l} + e^{\lambda_{\gamma_{ij}}^l}}$$

is satisfied, finally, $y^1$, $y^2$ and $y^3$ are obtained as the inputs of the prediction layer.

Further, the regression operation of frame and rotation angle is carried out on feature maps $y^1$, $y^2$ and $y^3$, and the ship category loss, frame loss, rotation angle loss and score confidence loss are calculated. Then, the gradient descent algorithm is used to minimize the loss function and update the network parameters, and finally the weight file with the highest detection accuracy in the training process is saved. The loss function is composed of four parts: target classification loss, θ classification loss, border regression loss and confidence loss, and its expression is:

$$\mathcal{L}_{total} = \mathcal{L}_{cls} + \mathcal{L}_\theta + \mathcal{L}_{IOU} + \mathcal{L}_{obj} \quad (3),$$

the regression loss of the target frame $\mathcal{L}_{IOU}$ in formula (3) represents the coincidence degree between the target frame and the real frame when the target is located. $\mathcal{L}_{cls}$, $\mathcal{L}_\theta$ and $\mathcal{L}_{obj}$ are the target classification loss, θ classification loss and confidence regression loss, respectively. Use BCELogits (x, y) and two-class cross entropy loss function as the loss function of $\mathcal{L}_{cls}$, $\mathcal{L}_\theta$ and $\mathcal{L}_{obj}$: assuming that there are n samples Xi and their corresponding labels Yi in the data set $(x_i, y_i)\}_{i=1}^N$, the formula of BCELogits(x, y) is:

$$BCELogits(x, y) = -\frac{1}{N} \sum_{i=1}^{N} [y_i \log \sigma(x_i) + (1 - y_i) \log(1 - \sigma(x_i))], \quad (4)$$

σ in formula (4) is sigmoid function, and its expression is $$\sigma(x) = \frac{1}{1 + e^{-x}},$$

and the value range of σ(x) is (0,1). Using CIOU as the regression loss of target frame, this method is commonly used in YOLOv5. Finally, the video can be input into the network to obtain the ship detection results (x, y, w, h, θ), and the detection effect may be obtained by drawing the result data in the video to be detected.

S3, inputting the ship video into the rotating ship detection network to output the rotating ship detection result, and inputting the result into the rotating ship tracking network to obtain the historical trajectory and ship heading information.

In the S3, obtaining rotating ship tracking and trajectory of the rotating ship includes the following steps.

Ship tracking: firstly, in the first frame, the rotating ship detection network will be used to detect the ship in the image to obtain the rotating frame of the ship, and a code will be marked for the ship in each rotating frame; in the second frame, the rotation frames of all ships will be obtained by the same method, and the rotation frame information will be decoupled into horizontal frame information and ship heading information. Then, Kalman filter is used to predict the prediction frame of the second frame according to the position of the detection frame of the first frame, and then the horizontal frame intersection ratio between the prediction frame of the second frame and all the detection frames of the second frame is calculated to establish the cost matrix. The Hungarian algorithm is used to obtain the n detection frames with the largest intersection ratio (in general, there are at most n overlapping ships in the image), and then the confidence $C_i$ (i=1, 2, ..., n) of these n detection frames is calculated by the following formula (5):

$$C=\tau*IOU+(1-\tau)*\theta_{score} \quad (5),$$

in formula (5), C is the final confidence score, $\tau$ is the weight of intersection ratio, and IOU is the intersection ratio of horizontal detection frame and horizontal prediction frame. $\theta_{score}$ is the angle similarity score of the front and back frames, and its calculation method is:

$$\theta_{score} = \frac{e^{\pi} - e^{|\theta_1 - \theta_2|}}{(e^{\pi} - 1)e^{|\theta_1 - \theta_2|}}, \quad (6)$$

$|\theta_1 - \theta_2|$ in formula (6) is the angle difference between the prediction frame and the detection frame; the value range of $\theta_{score}$ is (0,1).

The tracking network can make full use of the ship heading information by giving the partial weight of ship heading information, thus effectively preventing the re-recognition problem caused by occlusion in the tracking process. Finally selecting the rotating frame $C_{max}$ with the largest value in confidence $C_i$ (i=1, 2, ..., n) as the correct tracking target to complete the target tracking.

Trajectory acquisition: through the above target tracking frame, the historical trajectory of the ship and the ship heading information from the video (since the angle marked is along the stern to the bow, the ship heading information can be well judged by angle detection), and the format of one trajectory point is (x, y, θ), which are the abscissa of the center point, ordinate of the center point and current ship heading of the trajectory respectively.

S4, inputting the historical ship trajectory and ship heading information into the ship trajectory and ship heading prediction network to predict the ship trajectory and ship heading at sea.

In the S4, the prediction of ship trajectory and ship heading includes the following steps:

Data cleaning: obtaining the tracking data of S3, firstly, screening trajectories with tracking frames less than 120 frames, trajectories with excessively concentrated trajectory points (ships in anchored state) and abnormal trajectories for deletion, then processing the tracks with abnormal ship heading information (for example, the angle change of the front and rear trajectory points is greater than a certain angle) for deletion and frame insertion, and finally obtaining an effective trajectory sequence ($x_i$, $y_i$, θ). $x_i$ represents the abscissa of the center point of the i-frame ship trajectory, $y_i$ represents the ordinate of the center point of the i-frame ship trajectory, and $\theta_i$ represents the i-frame ship heading.

Prediction of trajectory and ship heading: in the process of trajectory prediction, too short a prediction time may not guarantee the ship in the unknown scene at sea, and too long a prediction time will lose the accuracy of the prediction process. The predicted time is assumed to be X seconds, that is, the video image of X*FPS (video frame rate) frames, and then the coordinates ($x_i$, $y_i$, $\theta_i$) of a point are extracted from the tracking trajectory sequence every 2*X frames, and every 2*X points are used as an input sequence and as the input of trajectory and ship heading to the prediction network. The prediction network can adopt long-term and short-term memory networks. Finally, the data sequence ($x_i$, $y_i$, $\theta_i$) of the ship trajectory and the ship heading in x seconds can be predicted through the network, where i∈(0, x*FPS). Only by inputting the video trajectory sequence into the prediction network, the prediction information future trajectory and heading of each ship can be obtained.

The application provides a ship image trajectory tracking and prediction method based on ship heading recognition. The ship heading detection is added to the conventional ship detection, and the common boundary problem in rotation detection is improved by using the circular smooth label method. The spatial coordinate attention mechanism and the self-adaptive feature fusion method are added to the detection network to increase the detection accuracy, and the detected ship heading information is used in tracking network to improve the re-recognition problem caused by the overlapping of ships in the video. Finally, the tracked ship trajectory and ship heading information are used to predict the future ship trajectory. The method has a good effect of ship tracking and trajectory prediction, and the finally obtained trajectory and prediction data can be used for identifying abnormal behaviors of ships, judging dangers, etc., which can effectively improve the safety of autonomous navigation of intelligent ships.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. A ship image trajectory tracking and prediction method based on ship heading recognition, comprising:
   S1: obtaining a ship image data set, and preprocessing the ship image data set to obtain a preprocessed data set;
   S2: inputting the preprocessed data set into a rotating ship detection network for training to obtain a trained rotating ship detection network, collecting a ship navigation video, and inputting the ship navigation video into the trained rotating ship detection network to obtain a ship detection result;
   S3: inputting the ship detection result into a rotating ship tracking network, and tracking a target ship, so as to obtain historical trajectory and ship heading information of the target ship; and
   S4: inputting the historical trajectory and the ship heading information of the target ship into a ship trajectory and ship heading prediction network, and predicting the navigation trajectory and ship heading of sea ships.

2. The ship image trajectory tracking and prediction method according to claim 1, wherein preprocessing the ship image data set comprises:
   labeling label data containing the ship heading information by using an 8-parameter rotating frame labeling method, and preprocessing labeled images and labels, and processing the ship heading information by a way of circular smooth label and outputting ship heading data; wherein the label data comprises an abscissa of a center of a marking frame, an ordinate of the center of the marking frame, a width of the marking frame, a height of the marking frame and processed ship heading information.

3. The ship image trajectory tracking and prediction method according to claim 1, wherein the process of inputting the preprocessed data set into the rotating ship detection network for training comprises:

inputting the preprocessed data set into a backbone network added with a coordinate attention module for ship feature extraction, performing a feature fusion through a feature pyramid, and outputting a first ship feature map; inputting the first ship feature map into a pixel aggregation network for a further ship feature processing, outputting a second feature map; fusing the second feature map based on an adaptive fusion method to obtain a third ship feature map; performing a border and rotation angle regression operation on the third ship feature map, and calculating ship category loss, border loss, rotation angle loss and score confidence loss; minimizing a loss function by using a gradient descent algorithm and updating network parameters to complete the training of the rotating ship detection network.

4. The ship image trajectory tracking and prediction method according to claim 3, wherein the coordinate attention module aggregates ship feature images input in vertical and horizontal directions into two independent directional perception feature maps through two one-dimensional global pooling operations.

5. The ship image trajectory tracking and prediction method according to claim 3, wherein the loss function comprises target classification loss, θ classification loss, border regression loss and confidence loss, and the expression of the loss function $\mathcal{L}_{total}$ is as follows:

$$\mathcal{L}_{total} = \mathcal{L}_{cls} + \mathcal{L}_{\theta} + \mathcal{L}_{IOU} + \mathcal{L}_{obj}$$

wherein $\mathcal{L}_{IOU}$ is target border regression loss, and $\mathcal{L}_{cls}$, $\mathcal{L}_{\theta}$ and $\mathcal{L}_{obj}$ are the target classification loss, the θ classification loss and confidence loss, respectively.

* * * * *